(12) United States Patent
Liu et al.

(10) Patent No.: US 12,411,205 B2
(45) Date of Patent: Sep. 9, 2025

(54) BROADCAST-TYPE UNDERWATER NAVIGATION POSITIONING SYSTEM AND METHOD

(71) Applicant: FIRST INSTITUTE OF OCEANOGRAPHY, MINISTRY OF NATURAL RESOURCES, Shandong (CN)

(72) Inventors: Yang Liu, Shandong (CN); Yanxiong Liu, Shandong (CN); Menghao Li, Shandong (CN); Guanxu Chen, Shandong (CN)

(73) Assignee: FIRST INSTITUTE OF OCEANOGRAPHY, MINISTRY OF NATURAL RESOURCES, Qingdao (CN)

( * ) Notice: Subject to any disclaimer, the term of this patent is extended or adjusted under 35 U.S.C. 154(b) by 0 days.

(21) Appl. No.: 18/260,292

(22) PCT Filed: Dec. 2, 2021

(86) PCT No.: PCT/CN2021/135051
§ 371 (c)(1),
(2) Date: Jul. 3, 2023

(87) PCT Pub. No.: WO2023/082382
PCT Pub. Date: May 19, 2023

(65) Prior Publication Data
US 2024/0053431 A1 Feb. 15, 2024

(30) Foreign Application Priority Data
Nov. 15, 2021 (CN) .......................... 202111344256.0

(51) Int. Cl.
*G01S 5/18* (2006.01)
*G01S 5/30* (2006.01)

(52) U.S. Cl.
CPC ................ *G01S 5/183* (2013.01); *G01S 5/30* (2013.01); *G01S 2205/04* (2020.05)

(58) Field of Classification Search
CPC ....... G01C 21/1652; G01S 11/14; G01S 5/30; G01S 1/753; G01S 3/801; G01S 5/183;
(Continued)

(56) References Cited

U.S. PATENT DOCUMENTS 7,542,376 B1 * 6/2009 Thompson .............. G01S 15/89
367/104
7,889,600 B2 * 2/2011 Thompson .............. G01S 15/89
367/103
(Continued)

FOREIGN PATENT DOCUMENTS

| CN | 105974363 A | 9/2016 |
|----|-------------|--------|
| CN | 106501774 A | 3/2017 |

(Continued)

OTHER PUBLICATIONS

ISR of PCT/CN2021/135051.

*Primary Examiner* — Daniel L Murphy
*Assistant Examiner* — Amie N Ndure

(57) ABSTRACT

The disclosure provides a broadcast-type underwater navigation positioning system and method, wherein the system comprises a base station network consisting of a plurality of underwater base stations distributed on a seabed and a to-be-positioned user terminal located underwater, wherein the underwater base station comprises a bottom-mounted sonar and an mooring sonar, the bottom-mounted sonar and the mooring sonar are connected through a cable and are configured for ranging and communication through an underwater acoustic signal, the mooring sonar is integrated with an inertial measurement unit I, and the user terminal is provided with a passive sonar configured to unidirectionally receive an underwater acoustic signal sent by the mooring
(Continued)

sonar for ranging and communication. The underwater navigation positioning system and method disclosed in the present invention can expand the service range of the base station, increase the capacity of the user terminal and improve the precision of regional sound velocity products.

10 Claims, 2 Drawing Sheets

(58) Field of Classification Search
CPC ... G01S 7/52006; G01S 15/86; G01S 2205/04
USPC .................................. 367/99, 123; 701/300
See application file for complete search history.

(56) References Cited

U.S. PATENT DOCUMENTS

| | | | |
|---|---|---|---|
| 10,594,916 B2* | 3/2020 | Sivan | H04W 4/80 |
| 10,823,865 B2* | 11/2020 | Berg | G01V 1/162 |
| 11,019,246 B2* | 5/2021 | Sivan | G06F 3/013 |
| 2010/0014386 A1* | 1/2010 | Thompson | G01S 15/89 |
| | | | 367/103 |
| 2016/0124081 A1* | 5/2016 | Charlot | G01S 15/874 |
| | | | 367/13 |
| 2016/0359570 A1* | 12/2016 | Felemban | G01S 19/51 |
| 2018/0275298 A1* | 9/2018 | Berg | G01V 1/162 |
| 2019/0387152 A1* | 12/2019 | Sivan | G06F 3/012 |
| 2020/0195833 A1* | 6/2020 | Sivan | G06F 3/013 |

FOREIGN PATENT DOCUMENTS

| | | |
|---|---|---|
| CN | 110907979 A | 3/2020 |
| CN | 112068078 A | 12/2020 |
| CN | 113525593 A | 10/2021 |

* cited by examiner

BROADCAST-TYPE UNDERWATER NAVIGATION POSITIONING SYSTEM AND METHOD

TECHNICAL FIELD

The present invention belongs to the field of underwater navigation positioning, and particularly relates to a broadcast-type underwater navigation positioning system and method.

BACKGROUND

Due to the attenuation and blockage of seawater, global navigation satellite system (GNSS) signals cannot be used for underwater and seabed navigation positioning. Underwater navigation positioning technologies mainly include acoustics, inertia, matching (terrain, gravity, magnetic force, etc.), and the like. The technologies are limited by their own defects, since the inertial navigation has drifts and needs to be calibrated regularly, and the matching navigation needs background fields as well as characteristic environments, resulting in large matching errors and low usability. At present, acoustics is the main technical method for underwater navigation positioning. However, in the underwater acoustic navigation positioning, there exist problems such as small service range of the base station, short operating distance, small capacity of the terminal users, and low positioning precision, as specifically explained below.

(1) Small service range of the base station: in the existing local underwater acoustic positioning system, the distance between the seabed base stations is generally designed to be 1-2 km and the height of the base station is generally 2-3 m under the influence of negative bending (approaching the seabed) of acoustic rays, and for the acoustic ray visibility, the height of the base station must be increased by about 3 m every time the distance between the base stations is increased by 1 km in order for ranging and communication between the base stations, which greatly increases the difficulty of base station construction and maintenance cost. With this configuration, if the underwater positioning system is intended to serve users in a large range (for example, dozens or hundreds of kilometers), a large number of base stations need to be built and position calibration operations need to be carried out, which is extremely costly and extremely inefficient.

(2) Small capacity of the terminal users: at present, the transponder-type positioning mode mainly adopted by underwater positioning needs to distinguish interrogator signals transmitted by different user terminals, so the number of users being served at the same time is extremely limited, and the active mode is easy to expose the positions of the users, it is therefore not adapted to meet the requirements for synchronous work and concealment of a large number of underwater operation targets.

(3) Low positioning precision: at present, since the seawater sound velocity measurement error is generally not less than 5 cm/s, there exist sound velocity measurement errors and its spatio-temporal changes in underwater acoustic navigation positioning as well as geometric observation intensities are low, leading to poor three-dimensional positioning precision of the terminal and low operation efficiency.

In view of this, the main factors influencing the underwater positioning performance of the terminal are the spatio-temporal reference maintenance of the underwater base stations, the observing geometric graphic structure of the terminal, sound velocity errors and spatio-temporal changes thereof. In view of the three problems mentioned above, three key technologies, namely, the expansion of service area of the underwater base stations, the precise time synchronization in broadcast-type positioning among base stations and between a base station and a user terminal, and the fine processing and correction of sound velocity errors, need to be mainly focused on.

With increasing long-distance and high-precision deep-sea applications (for example, seabed resource exploration, near-bottom multi-beam measurement, AUV networking, etc.), it is necessary to research a wide-coverage underwater acoustic measurement technology that increases the capacity of the terminal users while ensuring high precision.

SUMMARY

In order to solve the technical problems mentioned above, the present invention provides a broadcast-type underwater navigation positioning system and method to achieve the purposes of expanding the service range of the base station, increasing the capacity of the user terminal and improving the precision of regional sound velocity structures.

For the above purposes, the technical schemes of the present invention are as follows:

A broadcast-type underwater navigation positioning system comprises a base station network consisting of a plurality of underwater base stations distributed on a seabed and a to-be-positioned user terminal located underwater, wherein the underwater base station comprises a bottom-mounted sonar and an mooring sonar, the bottom-mounted sonar and the mooring sonar are connected through a cable and are configured for ranging and communication through an underwater acoustic signal, an inertial measurement unit I is integrated on the mooring sonar, and the user terminal is provided with a passive sonar configured to unidirectionally receive an underwater acoustic signal sent by the mooring sonar for ranging and communication.

In the above scheme, the mooring sonar is further integrated with a conductivity-temperature-depth measuring instrument, a pressure gauge and a current meter, and the user terminal is further provided with an inertial measurement unit II.

A broadcast-type underwater navigation positioning method adopting the above broadcast-type underwater navigation positioning system comprises the following steps:

step I. obtaining the position coordinate of each bottom-mounted sonar with a GNSS-acoustic ranging and positioning technology;

step II. performing a transponder-type measurement by the mooring sonar and the bottom-mounted sonar through an underwater acoustic signal, and calculating the position coordinate of the mooring sonar according to a delay of the underwater acoustic signal measured by the mooring sonar and an observation value by the inertial measurement unit I; and step III. generating and broadcasting an underwater acoustic ranging signal and sound velocity correction data by the mooring sonar according to a preset time interval, decoding to obtain an underwater acoustic delay and sound velocity correction data from a time point for transmitting the underwater acoustic ranging signal to a time point for receiving the underwater acoustic ranging signal by a passive sonar of the user terminal after receiving the underwater acoustic ranging signal and the sound velocity correction data broadcasted by the mooring sonar, and determining a position of its own by the passive sonar according to the underwater acoustic delay and the sound velocity correction data, wherein in the process of positioning, time synchronization is regularly performed among mooring sonars of each underwater base station, and between the user terminal and the base station network.

In a further technical scheme, in the step II, the position coordinate of the mooring sonar is calculated with the aid of data measured by the conductivity-temperature-depth measuring instrument, the pressure gauge and the current meter that are integrated on the mooring sonar.

In the above scheme, the generating the sound velocity correction data comprises the following steps:
(1) calculating sound velocity by utilizing multi-source data, decomposing the sound velocity into a space function and a time function, and constructing an sound velocity background field;
(2) taking the constructed sound velocity background field as a priori value, taking propagation delay data of the underwater acoustic ranging signal observed in real time among mooring sonars of each underwater base station as an input, and obtaining an underwater acoustic ranging signal propagation delay caused by an sound velocity error including a horizontal gradient;
(3) constructing an sound velocity error tomographic equation set by utilizing the underwater acoustic ranging signal propagation delay caused by the sound velocity error, and performing a regional sound velocity error inversion by adding a constraint condition; and
(4) generating the sound velocity correction data by utilizing the regional sound velocity error obtained in the previous step and the sound velocity reference self-defined by a base station system.

In the above scheme, the time synchronization among mooring sonars of each underwater base station is corrected with two transponder-type measurements between two mooring sonars by utilizing current speed and current direction measured by a current meter, so that the time synchronization between the two mooring sonars is realized, and the specific method is as follows:
transmitting a pulse signal by an mooring sonar A, and receiving and processing the pulse signal by an mooring sonar B to obtain a delay $t_{B1}$; then, responding with a pulse signal by the mooring sonar B after an agreed delay $\Delta d$, and receiving the pulse signal by the mooring sonar A; then, responding with a pulse signal again by the mooring sonar A after the same agreed delay $\Delta d$, and receiving and processing the pulse signal by the mooring sonar B to obtain a delay $t_{B2}$ between the two pulse signals respectively transmitted and received by the mooring sonar B;
setting current correction to be $\Delta c$, if there is no current observation, then $\Delta c=0$, and then calculating synchronization time offset $\Delta T$ between the mooring sonar B and the mooring sonar A according to the measured $t_{B1}$ and $t_{B2}$ by the mooring sonar B: $\Delta T=0.5*(t_{B2}-\Delta d)+\Delta c-t_{B1}$; and adjusting, by the mooring sonar B, its own clock according to the synchronization time offset $\Delta T$ to realize time synchronization with the mooring sonar A; and
obtaining synchronization time offsets between other mooring sonars and the mooring sonar A by utilizing the same method, obtaining synchronization time offsets between any two adjacent mooring sonars by utilizing the same method, and then performing synchronization offset correction to realize precise time synchronization between all mooring sonars.

In the above scheme, the method for the time synchronization between the user terminal and the base station network is as follows:
describing a clock offset model of the user terminal as a quadratic polynomial model:

$$\Delta t = a_0 + a_1(t-t_{oc}) + a_2(t-t_{oc})^2;$$

wherein $\Delta t$ is a clock offset between the user terminal and the base station network, $t_{oc}$ represents the initial reference time selected by the clock offset model, $a_0$, $a_1$ and $a_2$ are clock offset, clock drift and frequency drift parameters of a clock of the user terminal, respectively, and t is the time when the user terminal receives an acoustic signal;
when the user terminal receives the underwater acoustic ranging signal from the base station network to resolve its own position, the clock offset $\Delta t$ obtained by parameter estimation is substituted into the above formula to obtain $a_0$, $a_1$, and $a_2$; when the user terminal does not receive the underwater acoustic ranging signal from the base station network, the clock offset $\Delta t$ is predicted by the quadratic polynomial model, and the time synchronization between the user terminal and the base station network is completed.

In the above scheme, the method for constructing the sound velocity background field in the step (1) is as follows: taking existing regional ocean analysis data and conductivity-temperature-depth of a numerical prediction model as background field constraints, adding data actually measured by the conductivity-temperature-depth measuring instrument integrated on the mooring sonar, and performing fusion processing on the multi-source data to obtain the sound velocity; according to spatial distribution characteristics of the sound velocity and a service area of the base station network, analyzing optimal boundary depth of the sound velocity profile; performing layered empirical orthogonal function decomposition based on depth, and decomposing the sound velocity into a space function and a time function; and representing sound velocity at any time and any position by the fitted time function and space function, and realizing the construction of a regional three-dimensional time-varying sound velocity background field.

In the above scheme, in the step (2), the underwater acoustic ranging signal propagation delay caused by the sound velocity error is represented by:

$$\delta T = M(\theta)\delta T_{NTD} + M_\Delta(\theta)[G_N\cos\varphi + G_E\sin\varphi]$$

$$M(\theta) = \frac{1}{\cos\theta} = \frac{1}{\sin\varepsilon}$$

$$M_\Delta(\theta) = M(\theta)\tan\theta = M(\varepsilon)\cot\varepsilon$$

wherein $\delta T$ is the underwater acoustic ranging signal propagation delay caused by the sound velocity error, $\delta T_{NTD}$ and $M(\theta)$ are a nadir total delay and a mapping function thereof, respectively, $G_N$ and $G_E$ are horizontal gradient terms in the north direction and the east direction, respectively, $M_\Delta(\theta)$ is a mapping function of the gradient term, $\theta$ and $\varepsilon$ are an initial incidence angle and an initial grazing angle of an acoustic ray, respectively, and $\varphi$ is an azimuth angle.

In the above scheme, the formula for the regional sound velocity error inversion in the step (3) is as follows:

$$\delta s = 1/(v + \delta v) - 1/v$$

$$\delta T_j = \int_\Gamma \delta s(x, z, t) dl \approx \sum_1^n \delta s_i(x, z, t) dl_i$$

wherein $\delta s$ is an sound velocity slowness error, $v$ is an initial sound velocity, $\delta v$ is an sound velocity error, $\delta T_j$ is an underwater acoustic ranging signal propagation delay caused by the sound velocity error of the $j^{th}$ acoustic signal, (x,z,t) are a horizontal position, depth and time of a grid, respectively, dl is an acoustic signal integral path, r is the total path, and i is a sub-grid sequence number travelled by the acoustic signal with i=1, 2, 3, . . . , n.

Through the above technical schemes, the broadcast-type underwater navigation positioning system and method provided by the present invention have the following beneficial effects:

(1) the present invention discloses a high-precision underwater broadcast-type positioning base station equipment that fuses bottom-mounted sonars with mooring sonars and integrates multi-source sensors, wherein the underwater base station adopts a mode of combining a bottom-mounted sonar and an mooring sonar, and the two sonars perform ranging between themselves, which realizes the real-time online calibration of the precise positions of the mooring sonars, such that the mooring sonars can be placed more than one hundred meters away from the seabed, greatly expanding the service range of the base station and showing the originality of the present invention.

(2) the present invention enables the number of base stations that need to be distributed and deployed on the seabed to be reduced in a certain service area, such that the time and cost required for position calibration for the base station with a GNSS-acoustic ranging and positioning technology, and thus the risk is reduced.

(3) a broadcast-type underwater positioning mode is adopted, such that the capacity of the user terminals has no upper limit theoretically, and the positioning result of the user terminal with low delay can be quickly updated (for example, a second-level updating);

(4) the present invention, by utilizing a constructed multi-source sound velocity background field and taking an underwater acoustic ranging signal propagation delay error estimation result with an additional sound velocity horizontal gradient and a slowness model as the basis, provides an sound velocity error tomographic inversion method based on a non-uniform grid model and generates sound velocity correction data, such that the precision of a regional sound velocity structure can be improved.

(5) the present invention can realize that the real-time online position calibration precision of an mooring sonar in the underwater base station reaches 0.1 m, the terminal positioning precision reaches 0.5 m, the precision of the regional priori sound velocity field model based on multi-source conductivity-temperature-depth data reaches 0.5 m/s, and the precision of the sound velocity error correction products in the broadcasting area based on the non-uniform grid model reaches 0.1 m/s.

(6) the present invention can realize the expansion of the service range and distance of the underwater base station, the precise time synchronization of the broadcast-type positioning and the fine processing and correction of sound velocity three-dimensional time-varying error, can effectively solve the problems of high cost, low efficiency and poor precision in the underwater navigation positioning, can break through the technical bottlenecks restricting the precision, continuity and usability of the underwater navigation positioning, can realize the large-range, long-distance, broadcast-type and high-precision underwater navigation positioning, and can significantly improve the performance of the underwater navigation positioning system, exhibiting important engineering-technical significance and application value.

BRIEF DESCRIPTION OF THE DRAWINGS

In order to more clearly illustrate the technical schemes in the embodiments of the present invention or in the prior art, the drawings required to be used in the description of the embodiments or the prior art will be briefly introduced below.

In the figures, 1 represents an underwater base station; 2 represents a user terminal; 3 represents a bottom-mounted sonar; 4 represents an mooring sonar; 5 represents a cable; 6 represents an underwater acoustic signal; 7 represents an inertial measurement unit I; 8 represents a pressure gauge; 9 represents a conductivity-temperature-depth measuring instrument; 10 represents a current meter; 11 represents a passive sonar; and 12 represents an inertial measurement unit II.

DETAILED DESCRIPTION OF THE EMBODIMENTS

The technical schemes in the embodiments of the present invention will be clearly and fully described below with reference to the drawings in the embodiments of the present invention.

The main factors influencing the service range and the operating distance of the underwater base station are the height of the sonar in the base station from the seabed and the performance of underwater acoustic signals.

Figure 1:
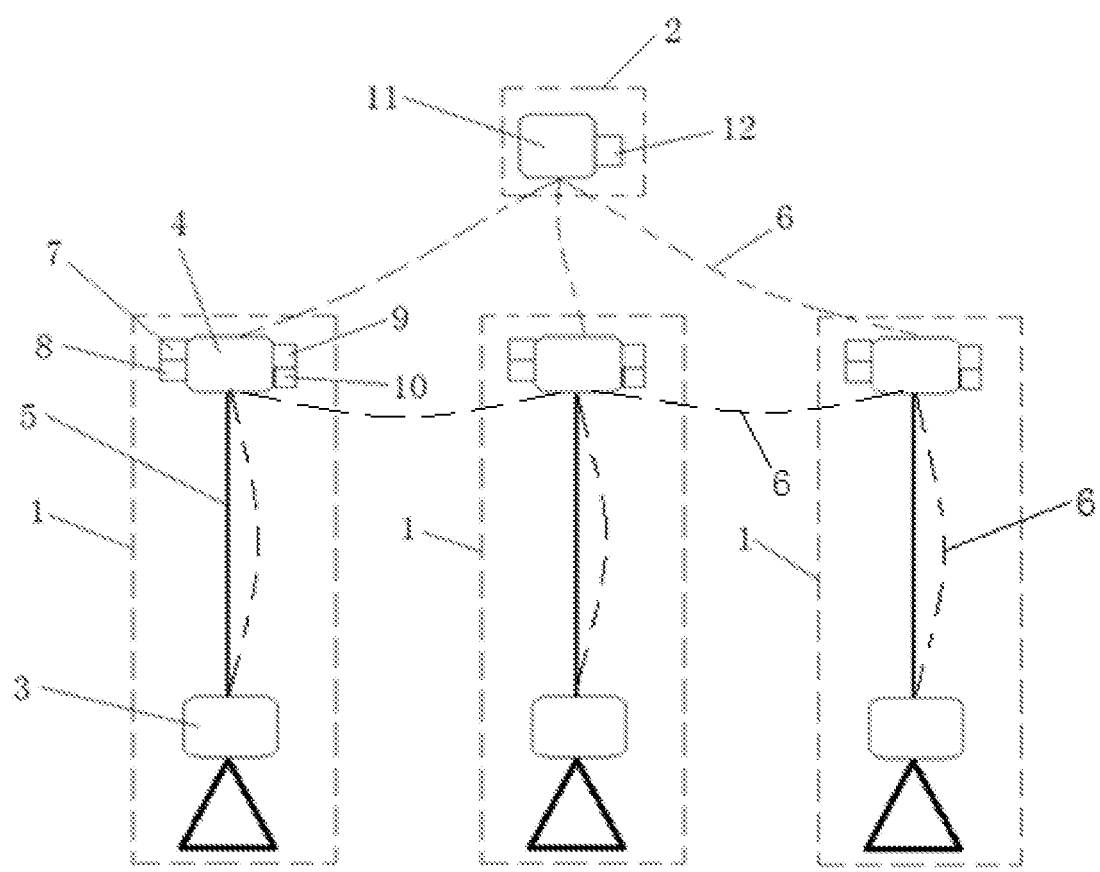
FIG. 1 is a schematic diagram of a broadcast-type underwater navigation positioning system disclosed in the embodiment of the present invention.

As shown in FIG. 1, the present invention provides a broadcast-type underwater navigation positioning system comprising a base station network consisting of a plurality of underwater base stations 1 distributed on a seabed and a to-be-positioned user terminal 2 located underwater, wherein the underwater base station 1 comprises a bottom-mounted sonar 3 and an mooring sonar 4, and the bottom-mounted sonar 3 and the mooring sonar 4 are connected through a cable 5.

The underwater base station 1 of the present invention adopts a mode of integrating the bottom-mounted sonar 3 and the mooring sonar 4, and the two sonars can perform ranging and communication between themselves. Wherein the mooring sonar 4 is integrated with the inertial measurement unit (IMU) I 7, and can be placed more than 100 m away from the seabed, greatly expanding the service range. The mooring sonar 4 can further be optionally equipped with an integrated pressure gauge 8 for calculating the depth; the mooring sonar 4 can further be optionally equipped with an integrated conductivity-temperature-depth (CTD) measuring instrument 9 for measuring the temperature, salinity and depth to construct an sound velocity field; and the mooring sonar 4 can further be optionally equipped with an integrated single-point current meter 10 for measuring the current speed and current direction of seawater to estimate the pose of the mooring sonar 4. By utilizing the underwater acoustic measurements between the bottom-mounted sonar 3 and the mooring sonar 4 and fusing the IMU observation values of the mooring sonar 4, the real-time high-precision position self-calibration of the position of the mooring sonar 4 is realized. The real-time high-precision position self-calibration of the mooring sonar 4 can also be fused with the measurement values of sensors such as the pressure gauge 8, the conductivity-temperature-depth measuring instrument 9 and the current meter 10.

The user terminal 2 of the present invention is equipped with the passive sonar 11 which performs ranging and communication with the mooring sonar 4 of the underwater base station 1 through the underwater acoustic signal 6 to locate the user terminal 2. The user terminal 2 can further be optionally equipped with an integrated inertial measurement unit (IMU) II 12 to perform underwater acoustics and inertia integrated navigation positioning of the user terminal 2.

The present invention can further improve the real-time dynamic position calibration precision of the mooring sonars through self-measurement array delay measurements among different underwater base stations 1. The broadcast-type underwater base station 1 of the present invention can integrate medium-frequency and low-frequency sonars, and can switch between a broadcast-synchronization-type positioning mode and an interrogator-transponder-type positioning mode.

Figure 2:
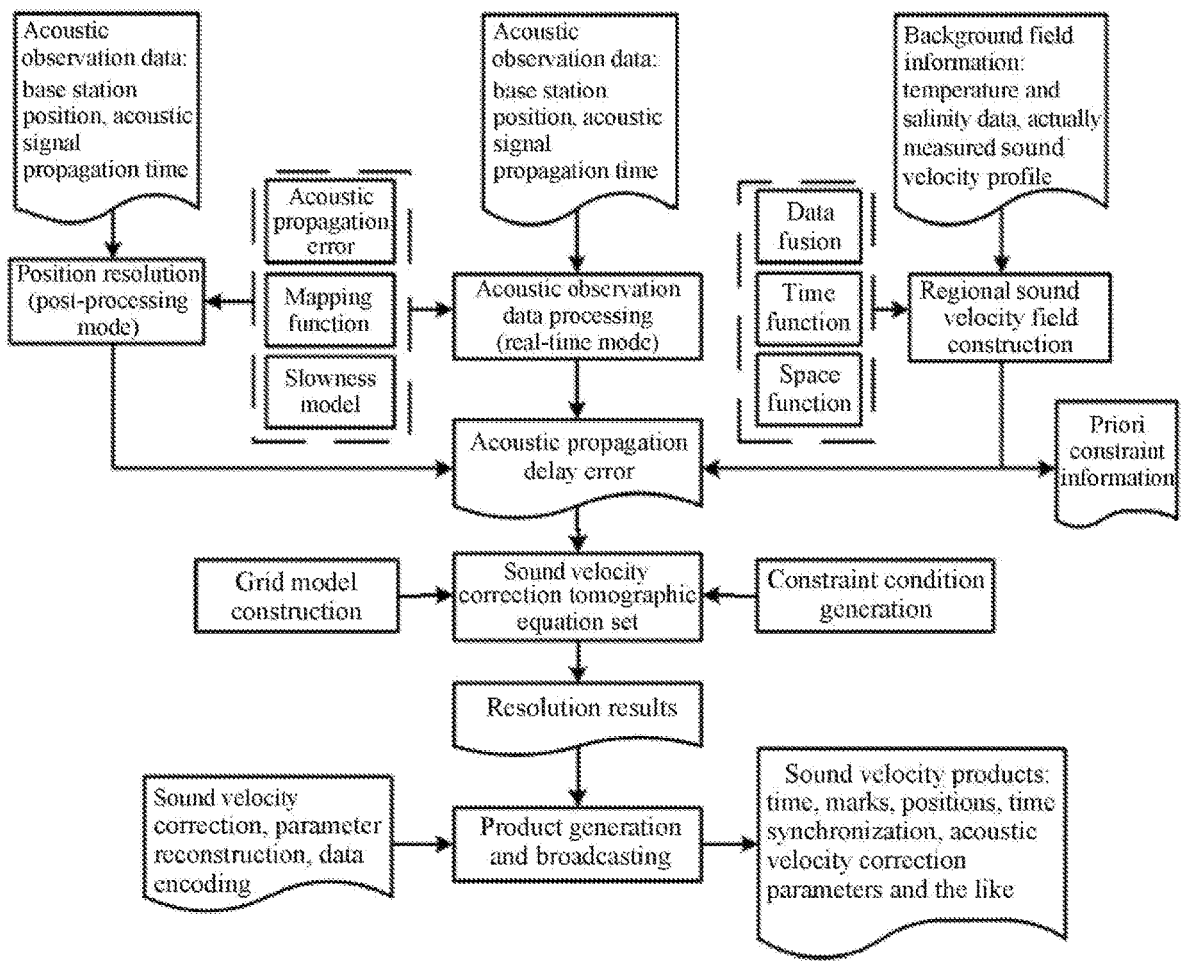
FIG. 2 is a flowchart showing the online inversion of sound velocity error as well as the generation and broadcasting of sound velocity correction data disclosed in the embodiment of the present invention.

The present invention provides a broadcast-type underwater navigation positioning method adopting the above broadcast-type underwater navigation positioning system, and the method comprises the following steps:

step I. obtaining the position coordinate of each bottom-mounted sonar 3 with a GNSS-acoustic ranging and positioning technology; and the GNSS-acoustic ranging and positioning can be performed according to the deployment positions of the bottom-mounted sonars 3.

step II. performing a transponder-type measurement by the mooring sonar 4 and the bottom-mounted sonar 3 through an underwater acoustic signal, and calculating the position coordinate of the mooring sonar 4 according to a delay of the underwater acoustic signal measured by the mooring sonar 4 and an observation value by the inertial measurement unit I 7; and step III. generating and broadcasting an underwater acoustic ranging signal and sound velocity correction data by the mooring sonar 4 according to a preset time interval, as shown in FIG. 2, decoding to obtain an underwater acoustic delay and sound velocity correction data from a time point for transmitting the underwater acoustic ranging signal to a time point for receiving the underwater acoustic ranging signal by the passive sonar 11 of the user terminal 2 after receiving the underwater acoustic ranging signal and the sound velocity correction data broadcasted by the mooring sonar 4, and determining a position of its own by the passive sonar according to the underwater acoustic delay and the sound velocity correction data, wherein in the process of positioning, time synchronization is regularly performed among mooring sonars of each underwater base station 4, and between the user terminal 2 and the base station network.

The propagation time of underwater acoustic signal 6 includes not only the distance information but also the sound velocity information of a signal propagation path. The method can utilize ocean conductivity-temperature-depth information to construct an sound velocity background field, and obtains an sound velocity error tomographic inversion and correction method based on the relation between the sound velocity spatio-temporal changes and the signal propagation time, thereby providing refined sound velocity error correction for regional underwater navigation positioning.

Wherein the generation and broadcasting of sound velocity correction data comprise the following steps:

(1) calculating sound velocity by utilizing multi-source data, decomposing the sound velocity into a space function and a time function, and constructing an sound velocity background field, and the specific method is as follows:

taking existing regional ocean analysis data and conductivity-temperature-depth of a numerical prediction model as background field constraints, adding data actually measured by the conductivity-temperature-depth measuring instrument, and performing fusion processing on the multi-source data to obtain the sound velocity; according to spatial distribution characteristics of the sound velocity and a service area of the base station network, analyzing optimal boundary depth of the sound velocity profile; performing layered empirical orthogonal function (EOF) decomposition based on depth, and decomposing the sound velocity into a space function and a time function; and representing sound velocity at any time and any position by the fitted time function and space function, and realizing the construction of a regional three-dimensional time-varying sound velocity background field.

(2) taking the constructed sound velocity background field as a priori value, taking propagation delay data of the underwater acoustic ranging signal observed in real time among mooring sonars 4 of each underwater base station as an input, and obtaining an underwater acoustic ranging signal propagation delay caused by an sound velocity error including a horizontal gradient;

The present invention is based on the assumption of horizontal layering of sound velocity changes, introduces a nadir total delay, and establishes an expression for the propagation delay error of the vertical underwater acoustic ranging signal; considers the difference of the acoustic signal propagation error in the horizontal direction, introduces sound velocity horizontal gradient terms, and establishes north-oriented and east-oriented gradient delay decomposition formulas; for the purpose of obtaining the delay error on the signal path, establishes a mapping function based on parameters such as the acoustic ray incident angle and the azimuth angle and projects the vertical delay error and the horizontal gradient delay to the acoustic ray direction to create the mapping function; performs an sound velocity error estimation with an additional sound velocity horizontal gradient by taking the sound velocity background field constructed in the step (1) as a priori value and taking data (acoustic signal propagation time, base station positions, etc.) observed in real time as an input.

The underwater acoustic ranging signal propagation delay caused by the sound velocity error is represented by:

$$\delta T = M(\theta)\delta T_{NTD} + M_\Delta(\theta)[G_N\cos\varphi + G_E\sin\varphi]$$

$$M(\theta) = \frac{1}{\cos\theta} = \frac{1}{\sin\varepsilon}$$

$$M_\Delta(\theta) = M(\theta)\tan\theta = M(\varepsilon)\cot\varepsilon$$

wherein δT is the underwater acoustic ranging signal propagation delay caused by the sound velocity error, $\delta T_{NTD}$ and M(θ) are a nadir total delay and a mapping function thereof, respectively, $G_N$ and $G_E$ are horizontal gradient terms in the north direction and the east direction, respectively, $M_\Delta(\theta)$ is a mapping function of the gradient term, θ and ε are an initial incidence angle and an initial grazing angle of an acoustic ray, respectively, and φ is an azimuth angle.

(3) constructing an sound velocity error tomographic equation set by utilizing the underwater acoustic ranging signal propagation delay caused by the sound velocity error, and performing a regional sound velocity error inversion by adding a constraint condition;

the present invention inverts the regional sound velocity error, establishes an expression for the underwater acoustic delay observation value and the slowness integral, and integrates and discretizes the slowness based on the acoustic signal path to construct an sound velocity error tomographic equation set;

analyzes the coverage range of the acoustic signal according to the state of the underwater base station 1 (static, dynamic, on the sea surface and underwater, etc.), and selects an appropriate grid model (such as a cuboid or an inverted cone, etc.) to represent the integral region;

sets grid resolution based on the density degree of the acoustic signals and the sound velocity change characteristics, constructs a non-uniform grid model, and extracts the integral path length of the slowness to realize the construction of the coefficient matrix of the tomographic equation set;

since the acoustic rays cannot pass through all the grids, the ill-posed problem of the tomographic equation set is caused, the present invention adds constraint equations to obtain the unique solution of the tomographic equation set, for example, the horizontal constraint relation between the sound velocity error correction parameters of the same layer is established in a distance weighted average mode and the like, the sound velocity vertical changes are characterized by a linear fitting mode and the like, and a vertical constraint equation is added by fitting polynomial; assigns an initial value and precision to the sound velocity error according to the sound velocity background field, and forces the sound velocity error values near the lower boundary of the grid to be constrained to zero or a minimal value because the sound velocity change in the deep ocean tends to be stable;

combining the constraint conditions and the tomographic equation set, the present invention utilizes equivalent weights to resolve sound velocity errors; extracts the corrected sound velocity structure and takes sound velocity data actually measured as a reference to evaluate regional sound velocity precision and timeliness.

The formula for the regional sound velocity error inversion is as follows:

$$\delta s = 1/(v + \delta v) - 1/v$$

$$\delta T_j = \int_\Gamma \delta s(x, z, t) dl \approx \sum_1^n \delta s_i(x, z, t) dl_i$$

wherein θs is a sound velocity slowness error, v is an initial sound velocity, δv is an sound velocity error, $\delta T_j$ is an underwater acoustic ranging signal propagation delay caused by the sound velocity error of the $j^{th}$ acoustic signal, (x,z,t) are a horizontal position, depth and time of a grid, respectively, dl is an acoustic signal integral path, r is the total path, and i is a sub-grid sequence number travelled by the acoustic signal with i=1, 2, 3, . . . , n.

(4) generating and broadcasting the sound velocity correction data by utilizing the regional sound velocity error obtained in the previous step and the sound velocity reference self-defined by a base station system.

Acoustic observation data are transmitted among the underwater base stations 1, sound velocity error estimation is independently performed in a distributed mode, and the sound velocity field is corrected and updated; in order to improve the data broadcasting efficiency and save the transmission cost, the present invention uses sound velocity correction products based on parameter reconstruction, calculates the sound velocity correction data of the regional grid (x,z,t) by utilizing the sound velocity result obtained by the estimation in the step (3) and the sound velocity reference self-defined by the base station system, and establishes the parameter expression of the sound velocity correction and the grid position, and on this basis, the reconstructed parameter information is broadcasted by each base station.

The formats of the sound velocity correction products of the present invention mainly include fields such as time, base station marks, positions, sound velocity correction reconstruction parameters, and self-defined sound velocity reference and the like, and data are sequentially encoded according to the grid spatial position and the field definition sequence. Based on the timeliness of sound velocity data, each acoustic base station actively broadcasts sound velocity correction products to users within the regional range; after passively receiving the messages broadcasted by the base station, the terminal users decode to obtain the sound velocity correction products, and perform grid interpolation or extrapolation to obtain information such as sound velocity correction according to the approximate position information of the users, and the terminal users can realize high-precision position resolution, clock error estimation, and sound velocity correction and the like.

In the process of positioning, the broadcast-type underwater positioning system needs to maintain high-precision clock synchronization between the mooring sonar 4 of the underwater base station and the user terminal 2.

Before the underwater base stations 1 of the present invention are distributed and deployed, clock deviation calibration is generally performed using an external precise clock source (such as GNSS timing), and after the calibration is completed, clocks of a plurality of underwater base stations 1 can be considered to be strictly synchronous with a deviation of a nanosecond order of magnitude. However, with the accumulation of underwater time and environmental differences such as temperature and salinity, the clock deviation between different underwater base stations 1 will increase. In order to ensure the positioning precision of the terminal, it is necessary to correct the clock deviation between the underwater base stations 1 to achieve time synchronization between the underwater base stations.

The underwater base station 1 of the present invention is equipped with a high-precision chip-scale atomic clock or quartz clock, and can regularly perform joint measurements with the GNSS-acoustic timing on the sea surface to correct clock drift of the base station and maintain an absolute time reference.

The underwater base stations 1 of the present invention perform periodic joint measurements and time synchronization deviation self-corrections among themselves to maintain an underwater relative time reference. In the present invention, when performing time synchronization among underwater base stations 1, it can be considered that the underwater clocks are stable in a short period of time, the current is relatively stable in a short period of time, and the positions of the mooring sonars 4 of the underwater base stations remain unchanged in a short period of time.

The time synchronization among mooring sonars 4 of each underwater base station is corrected with two transponder-type measurements between two mooring sonars 4 by utilizing current speed and current direction measured by a current meter 10, so that the time synchronization between the two mooring sonars 4 is realized, and the specific method is as follows:

transmitting a pulse signal by an mooring sonar A, and receiving and processing the pulse signal by an mooring sonar B to obtain a delay $t_{B1}$; then, responding with a pulse signal by the mooring sonar B after an agreed delay $\Delta d$, and receiving the pulse signal by the mooring sonar A; then, responding with a pulse signal again by the mooring sonar A after the same agreed delay $\Delta d$, and receiving and calculating the pulse signal by the mooring sonar B to obtain a delay $t_{B2}$ between the two pulse signals respectively transmitted and received by the mooring sonar B;

setting current correction to be $\Delta c$, if there is no current observation, then $\Delta c=0$, and then calculating synchronization time offset $\Delta T$ between the mooring sonar B and the mooring sonar A according to the measured $t_{B1}$ and $t_{B2}$ by the mooring sonar B: $\Delta T=0.5*(t_{B2}-\Delta d)+\Delta c-t_{B1}$; and adjusting, by the mooring sonar B, its own clock according to the synchronization time offset $\Delta T$ to realize time synchronization with the mooring sonar A; and obtaining synchronization time offsets between other mooring sonars and the mooring sonar A by utilizing the same method, obtaining synchronization time offsets between any two adjacent mooring sonars by utilizing the same method, and then performing synchronization offset correction to realize precise time synchronization between all mooring sonars.

The method for the time synchronization between the user terminal 2 and the base station network is as follows:

describing a clock offset model of the user terminal 2 as a quadratic polynomial model:

$$\Delta t = a_0 + a_1(t-t_{oc}) + a_2(t-t_{oc})^2;$$

wherein $\Delta t$ is a clock offset between the user terminal 2 and the base station network, $t_{oc}$ represents the initial reference time selected by the clock offset model, $a_0$, $a_1$ and $a_2$ are clock offset, clock drift and frequency drift parameters of a clock of the user terminal 2, respectively, and t is the time when the user terminal 2 receives an acoustic signal;

when the user terminal 2 receives the underwater acoustic ranging signal from the base station network to resolve its own position, the clock offset $\Delta t$ obtained by parameter estimation is substituted into the above formula to obtain $a_0$, $a_1$, and $a_2$; when the user terminal 2 does not receive the underwater acoustic ranging signal from the base station network, the clock offset $\Delta t$ is predicted by the quadratic polynomial model, and the time synchronization between the user terminal 2 and the base station network is completed.

The above description of the disclosed embodiments enables those skilled in the art to implement or use the present invention. Various modifications to these embodiments will be readily apparent to those skilled in the art, and the general principles defined herein may be applied to other embodiments without departing from the spirit or scope of the present invention. Thus, the present invention is not intended to be limited to these embodiments shown herein but is to accord with the broadest scope consistent with the principles and novel features disclosed herein.

What is claimed is:

1. A broadcast-type underwater navigation positioning system, comprising a base station network consisting of a plurality of underwater base stations distributed on a seabed and a to-be-positioned user terminal located underwater, wherein the underwater base station comprises a bottom-mounted sonar and an mooring sonar, the bottom-mounted sonar and the mooring sonar are connected through a cable and are configured for ranging and communication through an underwater acoustic signal, an inertial measurement unit I is integrated on the mooring sonar, and the user terminal is provided with a passive sonar configured to unidirectionally receive an underwater acoustic signal sent by the mooring sonar for ranging and communication.

2. The broadcast-type underwater navigation positioning system according to claim 1, wherein the mooring sonar is further integrated with a conductivity-temperature-depth measuring instrument, a pressure gauge and a current meter, and the user terminal is further provided with an inertial measurement unit II.

3. A broadcast-type underwater navigation positioning method adopting the broadcast-type underwater navigation positioning system according to claim 1, comprising the following steps:

step I. obtaining the position coordinate of each bottom-mounted sonar with a GNSS-acoustic ranging and positioning technology;

step II. performing a transponder-type measurement by the mooring sonar and the bottom-mounted sonar through an underwater acoustic signal, and calculating the position coordinate of the mooring sonar according to a delay of the underwater acoustic signal measured by the mooring sonar and an observation value by the inertial measurement unit I; and step III. generating and broadcasting an underwater acoustic ranging signal and sound velocity correction data by the mooring sonar according to a preset time interval, decoding to obtain an underwater acoustic delay and sound velocity correction data from a time point for transmitting the underwater acoustic ranging signal to a time point for receiving the underwater acoustic ranging signal by a passive sonar of the user terminal after receiving the underwater acoustic ranging signal and the sound velocity correction data broadcasted by the mooring sonar, and determining a position of its own by the passive sonar according to the underwater acoustic delay and the sound velocity correction data, wherein in the process of positioning, time synchronization is regularly performed among mooring sonars of each underwater base station, and between the user terminal and the base station network.

4. The broadcast-type underwater navigation positioning method according to claim 3, wherein in the step II, the position coordinate of the mooring sonar is calculated with the aid of data measured by the conductivity-temperature-depth measuring instrument, the pressure gauge and the current meter that are integrated on the mooring sonar.

5. The broadcast-type underwater navigation positioning method according to claim 3, wherein the generating the sound velocity correction data comprises the following steps:
  (1) calculating sound velocity by utilizing multi-source data, decomposing the sound velocity into a space function and a time function, and constructing an sound velocity background field;
  (2) taking the constructed sound velocity background field as a priori value, taking propagation delay data of the underwater acoustic ranging signal observed in real time among mooring sonars of each underwater base station as an input, and obtaining an underwater acoustic ranging signal propagation delay caused by an sound velocity error including a horizontal gradient;
  (3) constructing an sound velocity error tomographic equation set by utilizing the underwater acoustic ranging signal propagation delay caused by the sound velocity error, and performing a regional sound velocity error inversion by adding a constraint condition; and
  (4) generating the sound velocity correction data by utilizing the regional sound velocity error obtained in the previous step and the sound velocity reference self-defined by a base station system.

6. The broadcast-type underwater navigation positioning method according to claim 3, wherein the time synchronization among mooring sonars of each underwater base station is corrected with two transponder-type measurements between two mooring sonars by utilizing current speed and current direction measured by a current meter, so that the time synchronization between the two mooring sonars is realized, and the specific method is as follows:
  transmitting a pulse signal by an mooring sonar A, and receiving and processing the pulse signal by an mooring sonar B to obtain a delay $t_{B1}$; then, responding with a pulse signal by the mooring sonar B after an agreed delay $\Delta d$, and receiving the pulse signal by the mooring sonar A; then, responding with a pulse signal again by the mooring sonar A after the same agreed delay $\Delta d$, and receiving and processing the pulse signal by the mooring sonar B to obtain a delay $t_{B2}$ between the two pulse signals respectively transmitted and received by the mooring sonar B;
  setting current correction to be $\Delta c$, if there is no current observation, then $\Delta c=0$, and then calculating synchronization time offset $\Delta T$ between the mooring sonar B and the mooring sonar A according to the measured $t_{B1}$ and $t_{B2}$ by the mooring sonar B: $\Delta T=0.5*(t_{B2}-\Delta d)+\Delta c-t_{B1}$; and adjusting, by the mooring sonar B, its own clock according to the synchronization time offset $\Delta T$ to realize time synchronization with the mooring sonar A; and
  obtaining synchronization time offsets between other mooring sonars and the mooring sonar A by utilizing the same method, obtaining synchronization time offsets between any two adjacent mooring sonars by utilizing the same method, and then performing synchronization offset correction to realize precise time synchronization between all mooring sonars.

7. The broadcast-type underwater navigation positioning method according to claim 3, wherein the method for the time synchronization between the user terminal and the base station network is as follows:
  describing a clock offset model of the user terminal as a quadratic polynomial model:

$$\Delta t = a_0 + a_1(t-t_{oc}) + a_2(t-t_{oc})^2;$$

wherein $\Delta t$ is a clock offset between the user terminal and the base station network, $t_{oc}$ represents the initial reference time selected by the clock offset model, $a_0$, $a_1$ and $a_2$ are clock offset, clock drift and frequency drift parameters of a clock of the user terminal, respectively, and t is the time when the user terminal receives an acoustic signal;
  when the user terminal receives the underwater acoustic ranging signal from the base station network to resolve its own position, the clock offset $\Delta t$ obtained by parameter estimation is substituted into the above formula to obtain $a_0$, $a_1$, and $a_2$; when the user terminal does not receive the underwater acoustic ranging signal from the base station network, the clock offset $\Delta t$ is predicted by the quadratic polynomial model, and the time synchronization between the user terminal and the base station network is completed.

8. The broadcast-type underwater navigation positioning method according to claim 5, wherein the method for constructing the sound velocity background field in the step (1) is as follows: taking existing regional ocean analysis data and conductivity-temperature-depth of a numerical prediction model as background field constraints, adding data actually measured by the conductivity-temperature-depth measuring instrument integrated on the mooring sonar, and performing fusion processing on the multi-source data to obtain the sound velocity; according to spatial distribution characteristics of the sound velocity and a service area of the base station network, analyzing optimal boundary depth of the sound velocity profile; performing layered empirical orthogonal function decomposition based on depth, and decomposing the sound velocity into a space function and a time function; and representing sound velocity at any time and any position by the fitted time function and space function, and realizing the construction of a regional three-dimensional time-varying sound velocity background field.

9. The broadcast-type underwater navigation positioning method according to claim 5, wherein in the step (2), the underwater acoustic ranging signal propagation delay caused by the sound velocity error is represented by:

$$\delta T = M(\theta)\delta T_{NTD} + M_\Delta(\theta)[G_N \cos\varphi + G_E \sin\varphi]$$

$$M(\theta) = \frac{1}{\cos\theta} = \frac{1}{\sin\varepsilon}$$

$$M_\Delta(\theta) = M(\theta)\tan\theta = M(\varepsilon)\cot\varepsilon$$

wherein $\delta T$ is the underwater acoustic ranging signal propagation delay caused by the sound velocity error, $\delta T_{NTD}$ and $M(\theta)$ are a nadir total delay and a mapping function thereof, respectively, $G_N$ and $G_E$ are horizontal gradient terms in the north direction and the east direction, respectively, $M_\Delta(\theta)$ is a mapping function of the gradient term, $\theta$ and $\varepsilon$ are an initial incidence angle and an initial grazing angle of an acoustic ray, respectively, and $\varphi$ is an azimuth angle.

10. The broadcast-type underwater navigation positioning method according to claim 5, wherein the formula for the regional sound velocity error inversion in the step (3) is as follows:

$$\delta s = 1/(v + \delta v) - 1/v$$

$$\delta T_j = \int_\Gamma \delta s(x, z, t) dl \approx \sum_1^n \delta s_i(x, z, t) dl_i$$

wherein $\delta s$ is an sound velocity slowness error, $v$ is an initial sound velocity, $\delta v$ is an sound velocity error, $\delta T_j$ is an underwater acoustic ranging signal propagation delay caused by the sound velocity error of the $j^{th}$ acoustic signal, (x,z,t) are a horizontal position, depth and time of a grid, respectively, dl is an acoustic signal integral path, r is the total path, and i is a sub-grid sequence number travelled by the acoustic signal with i=1, 2, 3, . . . , n.

* * * * *